United States Patent [19]

Pareja

[11] 4,242,062
[45] Dec. 30, 1980

[54] DUAL PISTON PUMP WITH PRESSURE SEAL LUBRICATION FEATURE

[75] Inventor: Ramon Pareja, Edina, Minn.
[73] Assignee: Lear Siegler, Inc., Santa Monica, Calif.
[21] Appl. No.: 64,129
[22] Filed: Aug. 6, 1979
[51] Int. Cl.³ .......................... F04B 1/02; F04B 21/00
[52] U.S. Cl. ........................................ 417/536; 277/59
[58] Field of Search ................... 417/534–536; 277/59, 165, 188 A, 205

[56] References Cited

U.S. PATENT DOCUMENTS

| 3,233,554 | 2/1966 | Huber et al. | 417/534 X |
|---|---|---|---|
| 3,238,890 | 3/1966 | Sadler et al. | 417/536 |
| 3,744,936 | 7/1973 | Sadler | 417/536 |
| 4,093,240 | 6/1978 | Masuda et al. | 277/59 X |

*Primary Examiner*—Philip R. Coe
*Attorney, Agent, or Firm*—Orrin M. Haugen; Thomas J. Nikolai

[57] ABSTRACT

An improved pressure and vacuum seal arrangement for a piston-type pump utilizing a reciprocating plunger disposed within a cylindrical sleeve. The cylindrical sleeve is provided with a pressure seal assembly adjacent the outer end thereof and a vacuum seal assembly adjacent the inner end thereof, along with an annular groove formed between the two seal assemblies to isolate the vacuum seal from the pressure seal. The annular groove, which extends around the entire inner peripheral surface of the cylindrical sleeve is in communication with the pump inlet. The pressure seal assembly comprises a generally "U"-shaped cup held between inner and outer retaining discs, and wherein the inner retaining disc is disposed with its inner peripheral edge surface in normal running contact with the surface of the plunger and with the inner disc consisting of polytetrafluoroethylene. The vacuum seal assembly comprises a carbon guide adjacent the inner end of the cylindrical sleeve and an adjacent vacuum seal sleeve formed of polytetrafluoroethylene. The polytetrafluoroethylene sleeve is disposed outwardly of the carbon guide and resilient means are provided for biasing the inner peripheral surface of the vacuum sleeve against the outer peripheral surface of the plunger.

2 Claims, 2 Drawing Figures

DUAL PISTON PUMP WITH PRESSURE SEAL LUBRICATION FEATURE

BACKGROUND OF THE INVENTION

The present invention relates generally to positive displacement pumps, and more specifically to an improved sealing arrangement for such pumps. Essentially, the sealing arrangement of the present invention is adapted for use in piston-type pumps operating under substantial pressures, with the seal arrangement including both a pressure seal and a vacuum seal to enhance the overall operation of the pump.

The positive displacement piston-type pump of the present invention is particularly adapted for use in those certain applications requiring both high pressure and high capacity. The pump, together with the sealing arrangement, is capable of accomplishing these objectives while being both light in weight and economical in construction and operation. The structure of the pump includes an open crankcase or drive housing portion which is disposed centrally of the structure, together with a pair of opposed axially aligned cylinders. The pump drive includes a drive shaft having an eccentric thereon which carries or supports a cam or drive bearing. Connecting rod means secure the cam bearing assembly to reciprocating plungers which are adapted to move reciprocably within the cylindrical sleeves.

The seals include a pressure seal assembly which comprises a generally "U"-shaped cup held between inner and outer retaining discs, with the inner retaining disc consisting essentially of polytetrafluoroethylene. The vacuum seal assembly comprises an inner guide sleeve adjacent the inner end of the cylindrical sleeve for improved guiding capability, along with an adjacent vacuum sleeve of polytetrafluoroethylene disposed outwardly of the guide sleeve. Resilent means bias the vacuum sleeve against the outer peripheral surface of the plunger. Disposed generally mid-way between the pressure seal assembly and the vacuum seal assembly is an annular groove formed within the inner periphery of the cylindrical sleeve, with the annular groove being in communication with a bore formed through the wall of the sleeve to provide constant communication between the groove and the inlet chamber of the pump. The primary function of the annular groove is to isolate the pressure seal assembly from the vacuum seal assembly so that the vacuum seal assembly is never exposed to high pressures, such as may occur when certain components of the pressure seal assembly become defective.

The concept of the present invention is an improvement over those certain piston-type pumps disclosed in U.S. Pat. Nos. 3,238,890 and 3,744,936.

SUMMARY OF THE INVENTION

Therefore, it is a general object of the present invention to provide a positive displacement pump which is light in weight, economical in construction, readily serviceable, and which has a seal capability permitting application of the pump to high pressure and high capacity operations.

It is a further object of the present invention to provide a positive displacement pump with a dual piston arrangement, wherein the piston arrangement is disposed substantially diametrically across a hollow pump body, and wherein the pump utilizes plungers together with an outer sealing arrangement including both pressure seals and vacuum seals, and wherein the vacuum seals are protected from exposure to high pressures.

It is yet a further object of the present invention to provide an improved positive displacement pump utilizing a pair of axially displaced seals, including an outer pressure seal assembly, and an inner vacuum seal assembly, and wherein the individual seal assemblies are isolated, one from another, by means of an intervening annular groove exposed to the pump inlet.

Other and further objects of the present invention will become apparent to those skilled in the art upon a study of the following specification, appended claims, and accompanying drawings.

IN THE DRAWINGS

FIG. 1 is a vertical sectional view taken generally along the lines 1—1 of FIG. 2, this view being taken substantially diametrically of the pump structure and illustrating the details of the device; and FIG. 2 is a front elevational view, partially broken away, and illustrating the pump structure of the present invention, with the cutaway portion illustrating, in section, the further detail of the drive and seal arrangement.

DESCRIPTION OF THE PREFERRED EMBODIMENT

Figure 1:
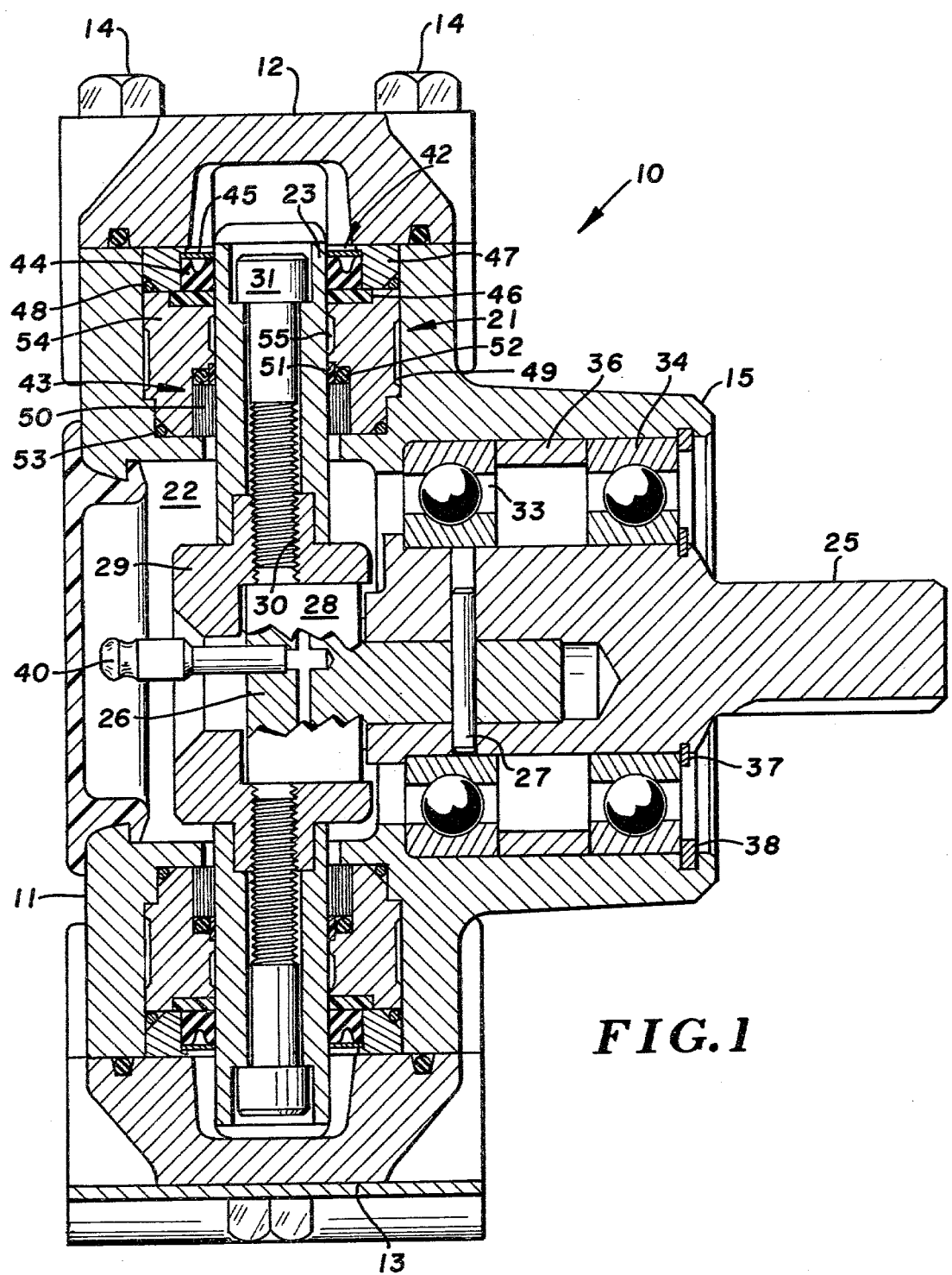

In accordance with the preferred embodiment of the present invention, and with reference to the drawings, the pump generally designated 10 comprises a body element or structure 11 together with a pair of cylinder heads 12 and 13 secured thereto. Normally, cap screws such as cap screws 14—14 are employed to secure the head to the body. Pump body 11 includes a boss portion or segment 15 in which the drive arrangement is mounted, as will be more fully explained hereinafter.

Pump body 11 is bored so as to define a closed loop having an endless passageway formed therein, such as at 16. An inlet port is in communication with said endless passageway as at 17, along with an outlet port as at 18. As is apparent, inlet port 17 is spaced from outlet port 18, as is, of course, conventional in positive displacement pumps of the type illustrated herein. A pair of spring biased inlet poppets or check valves are provided, one for each cylinder, with one such inlet valve being shown at 17A, along with a pair of spring biased outlet poppets, one for each cylinder, with one such outlet valve being shown at 18A.

Figure 2:
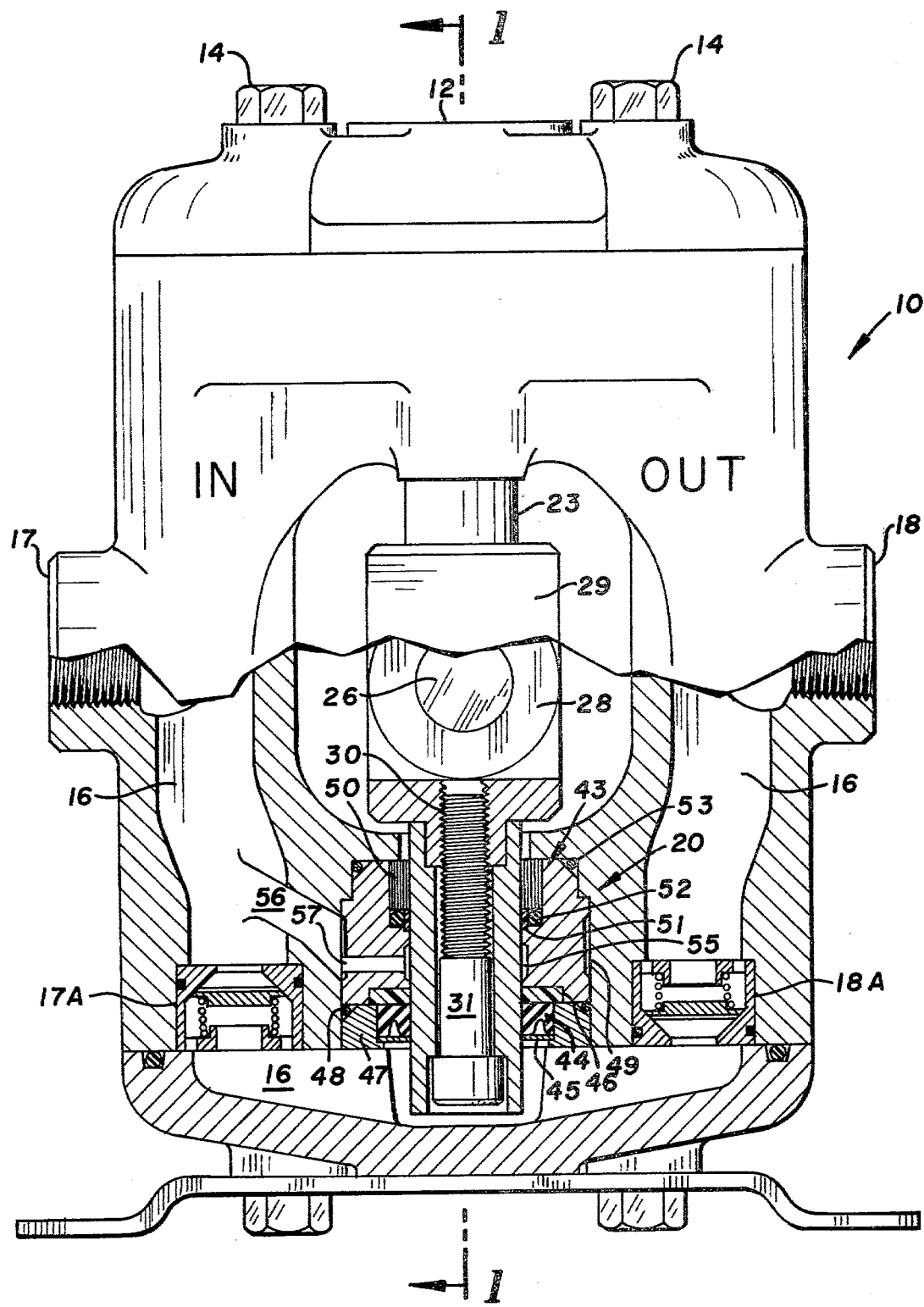

A pair of open-ended cylinders are disposed in spaced relationship between the inlet and outlet, with the cylinders being shown generally at 20 (FIG. 2) and 21 (FIG. 1). Since their structures are identical, one to another, only one such cylinder need be described in detail. The cylinders are, of course, open-ended with the inner ends being disposed substantially in communication with the inner open crankcase zone as at 22, and with the outer ends being exposed to the closed loop or endless passageway 16. The cylinders are, of course, substantially diametrically opposed, with each of the cylinder assemblies including a plunger, such as plunger 23.

Turning now to the details of the drive arrangement, a drive shaft is shown at 25 which is, of course, adapted to be coupled to a source of power providing rotary motion. An eccentric pin such as pin 26 is secured to the end of the drive shaft 25 by means of locking pin 27. Cam bearing 28 is mounted on pin 26, with the outer race of cam bearing 28 being operatively coupled to connecting rod 29. Connecting rod 29 is threadably bored at 30 so as to receive and retain the plunger cap screw 31 therewithin. Plunger cap screw 31 couples, as is indicated, plunger 23 to connecting rod 29.

In order to provide for proper drive and motion of drive shaft 25, a pair of main bearings are provided as at 33 and 34, with bearings 33 and 34 being, as indicated, ball bearings. A spacer sleeve is provided as at 36 in order to retain bearings 33 and 34 in proper predetermined disposition. Snap rings 37 and 38 are employed to retain drive shaft and the bearings in their proper orientation. A center-line grease fitting is provided as at 40 axially of the drive shaft in order to provide access to lubrication for cam bearing 28 retained in the open crank-case zone, through an opening formed in the connecting rod 29.

Turning now to the detail of the seal assemblies, a pressure seal assembly is shown generally at 42, with a vacuum seal assembly being shown generally at 43. The pressure seal assembly will be described in detail initially.

Pressure seal assembly 42 comprises a generally "U"-shaped member 44 which is held securely in place between discs 45 and 46. Disc 45 is a retainer ring, while disc 46 is a member fabricated from polytetrafluoroethylene. Polytetrafluoroethylene discs are commercially available under the trade name "Teflon" from E. I. DuPont de Nemours & Company of Wilmington, Delaware. An outer retaining member 47 is provided, with member 47 being sealed with O-ring 48 within bore 49 of pump body 11.

Vacuum seal assembly 43 comprises a graphite guide 50 together with polytetrafluoroethylene ring 51, with ring 51 being held in place and resiliently biased toward plunger 23 by O-ring 52. O-ring 53 seals sleeve element 54. Cylindrical sleeve 54 is provided with an annular groove midway between pressure seal assembly 42 and vacuum seal assembly 43, as at 55. Annular groove 55 is in direct communication with the inlet portion of the endless passageway 16 through bore or port 56. A communicating or connecting bore 57 is formed in sleeve 54.

It will be appreciated that the provision of annular groove 55 provides an effective isolation of the vacuum seal from the pressure side of the pump. Furthermore, the provision of groove 55 permits fluid to be held within the cylinder, thereby lubricating the back side of pressure seal assembly 42. This arrangement, in addition to lubricating the back side of the cup or pressure seal assembly, effectively reduces leakage in the overall system. Also, if leakage does occur at the pressure side, the leakage will be transmitted back into the inlet side of the pump.

Pump structures employing the seal arrangement of the present invention can be utilized effectively at pressures upwards of 1500 psi on a continuous basis.

I claim:

1. A piston-type pump comprising:
  (a) a housing defining a closed loop and having an endless passageway formed therein, said closed loop surrounding an inner crankcase, an inlet communicating with said endless passageway, an outlet spaced from said inlet and also communicating with said endless passageway, a pair of open-end cylinders lying mutually in spaced relation between said inlet and said outlet, each communicating with said endless passageway and with said inner crankcase, said cylinders being substantially diametrically opposed, cylindrical sleeve means having an inner end and an outer end and disposed in each of said cylinders and a plunger reciprocably positioned in each of said sleeves;
  (b) a drive shaft journaled for rotation within said housing, an eccentric crank portion along said drive shaft, self-aligning drive bearing means on said crank portion, connecting rods coupling said eccentric crank portion to each of said plungers;
  (c) each said cylindrical sleeve means having a pressure seal assembly adjacent said outer end thereof and a vacuum seal assembly adjacent said inner end thereof and an annular groove formed along the periphery of said cylindrical sleeve generally midway between said seal assemblies and a bore formed through the wall of said cylindrical sleeve coupling said annular groove to the inlet chamber of said pump body;
  (d) each said pressure seal assembly comprising a generally "U"-shaped cup held between inner and outer annular retaining discs wherein the inner peripheral edge surface of said inner retaining disc is disposed in running contact with said plunger surface, and wherein said inner annular disc consists of polytetrafluoroethylene;
  (e) each said vacuum seal assembly comprising an inner guide sleeve adjacent the inner end of said cylindrical sleeve means, and an adjacent vacuum sleeve of polytetrafluoroethylene disposed outwardly of said inner guide sleeve and resilient means biasing said vacuum sleeve against the outer surface of said plunger.

2. The piston-type pump as defined in claim 1 being particularly characterized in that each said annular groove extends around the entire inner circumference of its respective cylindrical sleeve.

* * * * *